United States Patent [19]

Hashimoto et al.

[11] Patent Number: 5,008,600
[45] Date of Patent: Apr. 16, 1991

[54] DEFLECTION YOKE DEVICE

[75] Inventors: Akira Hashimoto; Shunji Arai, both of Yokohama, Japan

[73] Assignee: Murata Mfg. Co., Ltd., Kyoto, Japan

[21] Appl. No.: 566,095

[22] Filed: Aug. 13, 1990

[30] Foreign Application Priority Data

Aug. 30, 1989 [JP] Japan ............... 1-101451[U]

[51] Int. Cl.⁵ .................................... H01J 29/56
[52] U.S. Cl. .............................. 315/370; 315/399
[58] Field of Search ............... 315/370, 399, 368

[56] References Cited

U.S. PATENT DOCUMENTS 3,456,149  7/1969  Van Mast .
3,898,520  8/1975  Gerritsen et al. ............. 315/370
3,906,303  9/1975  Gerritsen ...................... 315/370
4,677,349  6/1987  Ruby ............................. 315/368

Primary Examiner—Theodore M. Blum
Attorney, Agent, or Firm—Oliff & Berridge

[57] ABSTRACT

A deflection yoke device is a device for deflecting an electron beam traveling inside a CRT, and a deflection yoke device which is driven by a particularly high frequency has horizontal deflection coils each wound into a saddle-type configuration. In the invention, each horizontal deflection coil is provided with an intermediate terminal, and a damping circuit is provided between the intermediate terminals or between each intermediate terminal and a high voltage-side terminal or a low voltage-side terminal. The damping circuit eliminates electrical oscillations occurring in the horizontal deflection coil.

10 Claims, 2 Drawing Sheets

DEFLECTION YOKE DEVICE

BACKGROUND OF THE INVENTION

1. Field of the Invention

The present invention relates to a deflection yoke device and particularly to a deflection yoke device provided with a ringing preventing means.

2. Description of the Related Arts

A deflection yoke device is a device for deflecting an electron beam traveling in a CRT. This device has a horizontal deflection coil for deflecting an electron beam in a horizontal direction of the screen and a vertical deflection coil for deflecting it in a vertical direction thereof.

Horizontally and vertically deflecting currents having predetermined frequencies and sawtooth waveforms are respectively supplied to the horizontal deflection coil and the vertical deflection coil. Upon receiving the horizontally and vertically deflecting currents, the horizontal deflection coil and the vertical deflection coil respectively produces horizontally and vertically deflecting magnetic fields. The electron beam is deflected horizontally or vertically by the horizontally and vertically deflecting magnetic fields.

Here, an oscillating component is included in the horizontally deflecting current. The oscillating component is produced at the time of a rise of a sawtooth wave. This phenomenon is called ringing.

The ringing component resulting from the oscillation produces a striped pattern of relative density on the CRT screen (FIG. 5) and a waviness of scanning lines (FIG. 6).

Specifically, the ringing caused by oscillation produces a striped pattern of relative density in the vertical direction of the screen, as shown in FIG. 5. The ringing component (parasitic oscillating component) produces a vertical waviness on the scanning lines, as shown in FIG. 6.

Hitherto, to eliminate such trouble, the vertical deflection coil has been provided with a damping circuit.

FIG. 7 illustrates a circuit configuration of a vertical deflection coil provided with the damping circuit.

In FIG. 7, two vertical deflection coils 10-1 and 10-2 are connected in series. A damping circuit 14.1 formed by connecting a resistor 16-1 and a capacitor 18-1 in series is connected between a high voltage-side terminal 12 disposed at one end of the vertical deflection coil 10-1 and a central point of the vertical deflection coil 10-1. Similarly, a damping circuit 14-2 formed by connecting a resistor 16-2 and a capacitor 18-2 in series is connected between a low voltage-side terminal 20 disposed at one end of the vertical deflection coil 10-2 and a central point of the vertical deflection coil 10-2.

In this configuration, the parasitic oscillating component is substantially eliminated. More specifically, the parasitic oscillating component is attenuated by the resistors 16-1 and 16-2, and a DC component is eliminated by the capacitors 18-1 and 18-2, thereby suppressing the generation of heat in the resistors 16-1 and 16-2.

Conventionally, the vertical deflection coils have generally been fabricated into the form of a so called toroidal winding. In conjunction with the trends in recent years toward larger-size cathode ray tubes and higher definition of the picture, a frequency which is higher than the conventional level has come to be used as a horizontal deflection frequency. If a horizontal deflection is effected at a high frequency, the aforementioned ringing is more likely to occur.

To reduce the effect of ringing as a measure against this situation, it suffices if the vertical deflection coil is wound into the configuration such as is shown in FIG. 8. The winding of this configuration is generally referred to as a saddle-type winding, and has been conventionally employed for the horizontal deflection coil.

The adoption of this configuration makes it slightly difficult for the disturbance of the picture due to ringing to occur.

However, since the horizontal deflection takes place at a high frequency, the effect of ringing on the horizontal deflection coil cannot be eliminated even if a saddle-type vertical deflection coil is used.

SUMMARY OF THE INVENTION

Accordingly, an object of the present invention is to provide a deflection yoke device which is capable of reducing the effect of oscillation on the screen by eliminating a ringing component in a horizontally deflecting current, thereby overcoming the above-described drawback of the conventional art.

To this end, in accordance with the present invention, there is provided a deflection yoke device comprising:

(a) a first horizontal deflection coil wound into a saddle-type configuration;

(b) a second horizontal deflection coil wound into the saddle-type configuration and connected in parallel with the first horizontal deflection coil with one end of the second horizontal deflection coil connected thereto via a high voltage-side terminal and the other end of the second horizontal deflection coil connected thereto via a low voltage-side terminal;

(c) a first intermediate terminal provided on the first horizontal deflection coil;

(d) a second intermediate terminal provided on the second horizontal deflection coil; and (e) a damping circuit connected between the first intermediate terminal and the second intermediate terminal and adapted to eliminate electrical oscillations generated by the first and second horizontal deflection coils.

In the present invention, electrical oscillations occurring in the first and second horizontal deflection coils are eliminated by the damping circuit. Accordingly, even in a deflection yoke device having a high horizontal deflection frequency, the disturbance of a picture caused by the ringing of the horizontal deflection coils is substantially prevented from occurring.

In addition, as a specific configuration of the damping circuit, it is possible to cite one including a resistor, or one including a series circuit constituted by a resistor and a capacitor.

In the former configuration, since the oscillating component is attenuated by the resistor, the action of elimination of the oscillating component takes place.

In the latter configuration, a DC component is absorbed by the capacitor, so that heat generation in the resistor is suppressed.

Meanwhile, the first and second intermediate terminals respectively serve to demarcate the first and second horizontal deflection coils. In these demarcated sections, if the first and second intermediate terminals are disposed in such a manner that inductance is brought into equilibrium, the voltage applied to the damping circuit from the first and second intermediate terminals is reduced. As a result, heat generation in the damping circuit is suppressed.

By the equilibrium in inductance referred to herein is meant an equilibrium in a bridge circuit constituted by the demarcated horizontal deflection coils. Accordingly, such an arrangement in which the inductance is brought into an equilibrium means an arrangement in which a product of an inductance between the high voltage-side terminal and the first intermediate terminal and an inductance between the low voltage-side terminal and the second intermediate terminal is substantially equal to a product of an inductance between the high voltage-side terminal and the second intermediate terminal and an inductance between the low voltage-side terminal and the first intermediate terminal.

In accordance with another aspect of the present invention, there is provided a deflection yoke device comprising:

(a) a first horizontal deflection coil wound into a saddle-type configuration;

(b) a second horizontal deflection coil wound into the saddle-type configuration and connected in parallel with the first horizontal deflection coil with one end of the second horizontal deflection coil connected thereto via a high voltage-side terminal and the other end of the second horizontal deflection coil connected thereto via a low voltage-side terminal;

(c) a first intermediate terminal provided on the first horizontal deflection coil;

(d) a second intermediate terminal provided on the second horizontal deflection coil;

(e) a first damping circuit connected between the first intermediate terminal and the high voltage-side terminal and adapted to eliminate electrical oscillations generated by the first horizontal deflection coil; and (f) a second damping circuit connected between the second intermediate terminal and the low voltage-side terminal and adapted to eliminate electrical oscillations generated by the second horizontal deflection coil.

In this arrangement, electrical oscillations occurring in the first horizontal deflection coil are eliminated by the first damping circuit, and electrical oscillations occurring in the second horizontal deflection coil are eliminated by the second damping circuit. In this arrangement as well, a disturbance of a picture on the CRT screen attributable to ringing is prevented.

In this arrangement as well, the first and second damping circuits may be respectively provided with a series circuit constituted by a resistor and a capacitor.

DESCRIPTION OF THE PREFERRED EMBODIMENTS

Figure 1:
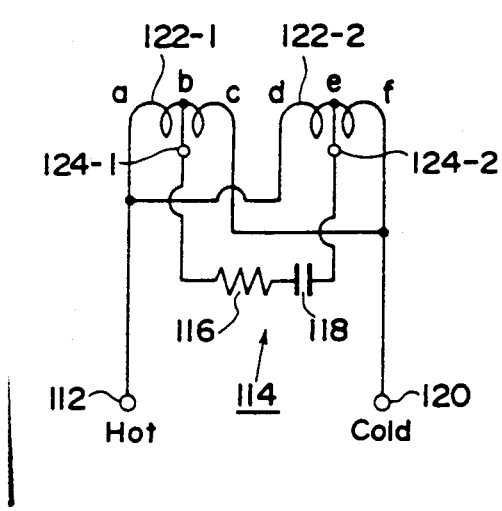
FIG. 1 is a circuit diagram illustrating a configuration of a deflection yoke device in accordance with a first embodiment of the present invention.

FIG. 1 illustrates a circuit configuration of a deflection yoke device in accordance with a first embodiment of the present invention.

The deflection yoke device of this embodiment comprises a pair of horizontal deflection coils 122-1 and 122-2 that are respectively wound into a straddle-type configuration and are connected in parallel. The horizontal deflection coil 122-1 is disposed on the top side of an unillustrated deflection yoke, while the horizontal deflection coil 122-2 is disposed on the bottom side thereof. In addition, one ends of the horizontal deflection coils 122-1 and 122-2 are connected to a high voltage-side terminal 112, while the other ends thereof are connected to a low voltage-side terminal 120. Accordingly, a horizontally deflecting current is supplied to the horizontal deflection coils 122-1 and 122-2 via the high voltage-side terminal 112 and the low voltage-side terminal 120.

The horizontal deflection coil 122-1 is provided with an intermediate terminal 124-1. Similarly, the horizontal deflection coil 122-2 is provided with an intermediate terminal 124-2. Connected between the intermediate terminals 124-1 and 124-2 is a damping circuit 114 which is a series circuit comprising a resistor 116 and a capacitor 118.

This damping circuit 114 corresponds to a characteristic component member of the present invention. The damping circuit 114 eliminates a ringing component attributable to the oscillation and included in the horizontally deflecting current supplied from the high voltage-side terminal 112 and the low voltage-side terminal 120. As a result, the parasitic oscillating component is prevented from entering the vertical deflection coil as well.

Specifically, the resistor 116 attenuates the oscillating component to an extent that the disturbance of a picture on the CRT screen presents no visual problem. The capacitor 118 reduces the heat generated by the resistor 116 by cutting a DC component.

In this embodiment, the intermediate terminals 124-1 and 124-2 are disposed so that the heat generation by the damping circuit 114, particularly the resistor 116 included therein, will be suppressed.

Figure 2:
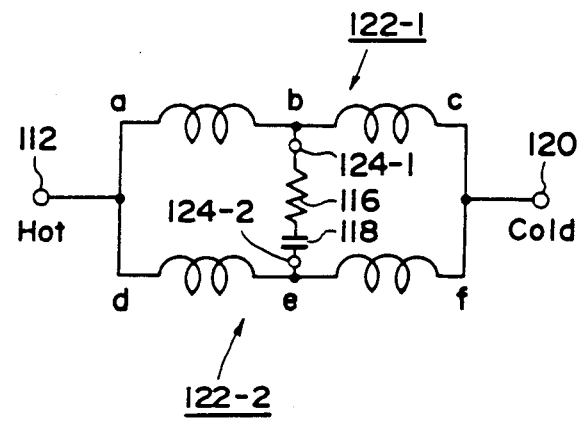
FIG. 2 is a circuit diagram illustrating an equilibrium in inductance in accordance with the first embodiment.

FIG. 2 illustrates a mode of arrangement of the intermediate terminals 124-1 and 124-2 in accordance with this embodiment.

In FIGS. 1 and 2, a terminal of the horizontal deflection coil 122-1 on the high voltage-side terminal 112 side is set as a, a terminal thereof on the intermediate terminal 124-1 side as b, and a terminal thereof on the low voltage-side terminal 120 side as c. Similarly, a terminal of the horizontal deflection coil 122-2 on the high voltage-side terminal 112 side is set as d, a terminal thereof on the intermediate terminal 124-2 side as e, and a terminal thereof on the low voltage-side terminal 120 side as f.

In order to suppress the heat generation at the resistor 116, it suffices if the intermediate terminals 124-1 and 124-2 are disposed in such a manner that the voltage applied between the positions b, e of the intermediate terminals becomes minimum. Since the horizontal deflection coils 122-1 and 122-2 are parts that have inductances, the voltage applied between the positions b, e of the intermediate terminals becomes minimum when the inductances are set in a state of equilibrium.

That is, it suffices if, in the bridge circuit shown in FIG. 2, the product of the inductance between a and b and the inductance between e and f becomes equal to the product of the inductance between d and e and the inductance between b and c. If this arrangement is adopted, only the ringing component attributable to the oscillation and included in the horizontally deflecting current flows across the damping circuit 114.

It should be noted that in this embodiment, since the horizontal deflection coils 122-1 and 122-2 are wound into the the saddle-type configuration, even if the positions b and e of the intermediate terminals are provided at central points of the horizontal deflection coils 122-1 and 122-2, the state of equilibrium in inductance is not obtained. For this reason, by exploring the position of an equilibrium in inductance experimentally or experientially, the effect of a reduction in heat generation can be obtained through the adequate arrangement of the intermediate terminals.

Figure 3:
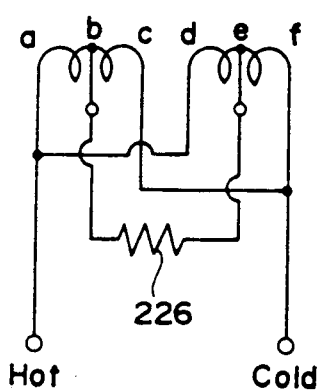
FIG. 3 is a circuit diagram illustrating a configuration of a deflection yoke device in accordance with a second embodiment of the present invention.

FIG. 3 illustrates a circuit configuration of a deflection yoke device in accordance with a second embodiment of the present invention.

In this embodiment, the damping circuit includes only a resistor 226.

In this embodiment, although it is not possible to obtain the effect of a reduction in heat generation by means of a capacity, it is possible to obtain the effect of the prevention of disturbance of a picture resulting from ringing as well as the effect of a reduction in heat generation through the arrangement of the intermediate terminals.

Figure 4:
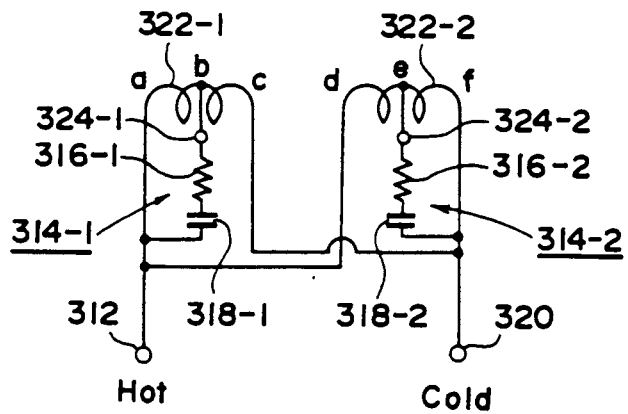
FIG. 4 is a circuit diagram illustrating a configuration of a deflection yoke device in accordance with a third embodiment of the present invention.
Figure 7:
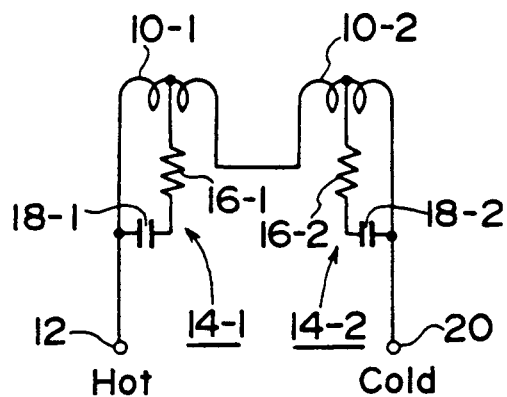
FIG. 7 is a circuit diagram illustrating an example of a configuration of a conventional vertical deflection coil.
Figure 5:
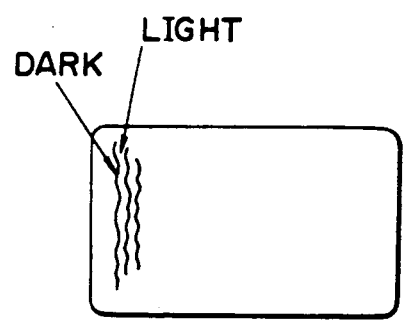
FIG. 5 is a diagram illustrating a striped pattern of relative density on a CRT screen.
Figure 8:
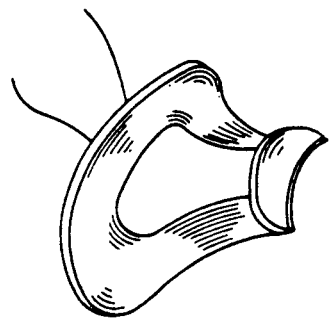
FIG. 8 is a diagram illustrating a configuration of a saddle-type winding.
Figure 6:
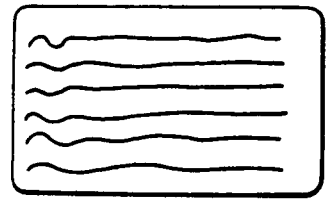
FIG. 6 is a diagram illustrating the waviness of scanning lines on a CRT screen.

FIG. 4 illustrates a circuit configuration of a deflection yoke device in accordance with a third embodiment of the present invention.

In this embodiment, two damping circuits 314-1 and 314-2 are provided. The damping circuit 314-1 is interposed between an intermediate terminal 324-1 and a high voltage-side terminal 312, while the damping circuit 314-2 is interposed between an intermediate terminal 324-2 and a high voltage-side terminal 320. The damping circuits 314-1 and 314-2 are series circuits respectively comprising a resistor 316-1 and a capacitor 318-1, and a resistor 316-2 and a capacitor 318-2.

In this embodiment, the oscillating component flowing across a first horizontal deflection coil 322-1 is eliminated by the damping circuit 314-1, and the oscillating component flowing across a second horizontal deflection coil 322-2 is eliminated by the damping circuit 314-2.

Accordingly, in this embodiment as well, it is possible to obtain the effect of the prevention of disturbance of a picture resulting from ringing as well as the effect of a reduction in heat generation by virtue of the capacitors 318-1 and 318-2.

It should be noted that in these embodiments the configuration of the winding of the vertical deflection coils is not shown. The reason for this is that a similar effect is produced regardless of whether the winding is of a toroidal type or a saddle type.

What is claimed is:

1. A deflection yoke device including a first horizontal deflection coil wound into a saddle-type configuration and a second horizontal deflection coil wound into the saddle-type configuration and connected in parallel with said first horizontal deflection coil with one end of said second horizontal deflection coil connected thereto via a high voltage-side terminal and the other end of said second horizontal deflection coil connected thereto via a low voltage-side terminal, said deflection yoke device comprising:

a first intermediate terminal provided on said first horizontal deflection coil;

a second intermediate terminal provided on said second horizontal deflection coil; and a damping circuit connected between said first intermediate terminal and said second intermediate terminal and adapted to eliminate electrical oscillations generated by said first and second horizontal deflection coils.

2. A deflection yoke device according to claim 1, wherein said damping circuit includes a series circuit constituted by a resistor and a capacitor.

3. A deflection yoke device according to claim 1, wherein said damping circuit includes a resistor.

4. A deflection yoke device according to claim 1, wherein said first intermediate terminal and said second intermediate terminal are disposed at positions where a product of an inductance between said high voltage-side terminal and said first intermediate terminal and an inductance between said low voltage-side terminal and said second intermediate terminal is substantially equal to a product of an inductance between said high voltage-side terminal and said second intermediate terminal and an inductance between said low voltage-side terminal and said first intermediate terminal.

5. A deflection yoke device according to claim 2, wherein said first intermediate terminal and said second intermediate terminal are disposed at positions where a product of an inductance between said high voltage-side terminal and said first intermediate terminal and an inductance between said low voltage-side terminal and said second intermediate terminal is substantially equal to a product of an inductance between said high voltage-side terminal and said second intermediate terminal and an inductance between said low voltage-side terminal and said first intermediate terminal.

6. A deflection yoke device according to claim 3, wherein said first intermediate terminal and said second intermediate terminal are disposed at positions where a product of an inductance between said high voltage-side terminal and said first intermediate terminal and an inductance between said low voltage-side terminal and said second intermediate terminal is substantially equal to a product of an inductance between said high voltage-side terminal and said second intermediate terminal and an inductance between said low voltage-side terminal and said first intermediate terminal.

7. A deflection yoke device including a first horizontal deflection coil wound into a saddle-type configuration and a second horizontal deflection coil wound into the saddle-type configuration and connected in parallel with said first horizontal deflection coil with one end of said second horizontal deflection coil connected thereto via a high voltage-side terminal and the other end of said second horizontal deflection coil connected thereto via a low voltage-side terminal, said deflection yoke device comprising:

a first intermediate terminal provided on said first horizontal deflection coil;

a second intermediate terminal provided on said second horizontal deflection coil;

a first damping circuit connected between said first intermediate terminal and said high voltage-side terminal and adapted to eliminate electrical oscillations generated by said first horizontal deflection coil; and a second damping circuit connected between said second intermediate terminal and said low voltage-side terminal and adapted to eliminate electrical oscillations generated by said second horizontal deflection coil.

8. A deflection yoke device according to claim 7, wherein said first damping circuit includes a series circuit constituted by a resistor and a capacitor.

9. A deflection yoke device according to claim 7, wherein said second damping circuit includes a series circuit constituted by a resistor and a capacitor.

10. A deflection yoke device according to claim 8, wherein said second damping circuit includes a series circuit constituted by a resistor and a capacitor.

* * * * *